Patented Aug. 1, 1944

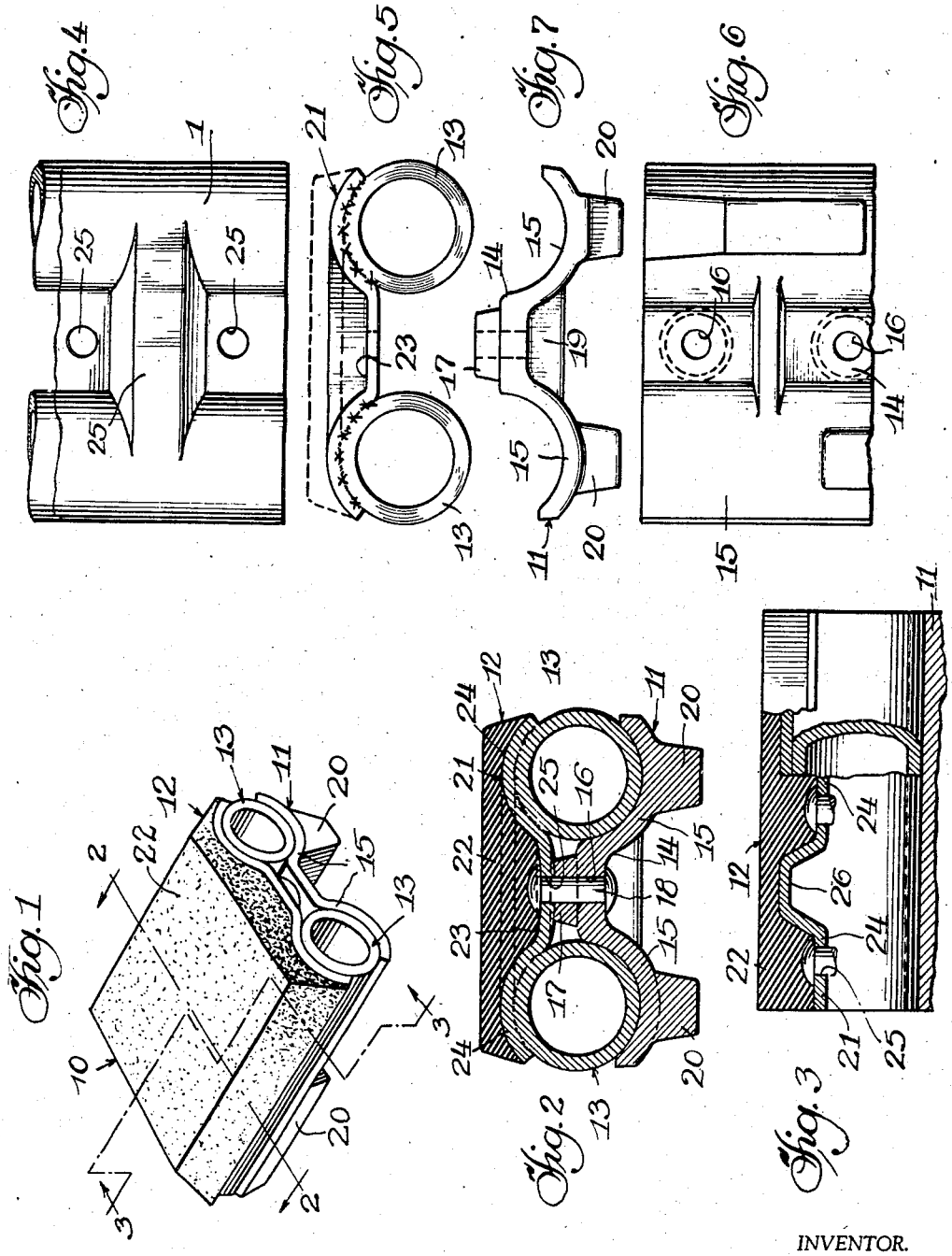

2,354,650

UNITED STATES PATENT OFFICE 2,354,650

METHOD OF MAKING ENDLESS TRACK TREADS

Frank E. Burgess, Geneva, Ill., assignor to Burgess-Norton Manufacturing Company, Geneva, Ill., a corporation of Illinois Original application March 8, 1942, Serial No. 435,208. Divided and this application April 12, 1944, Serial No. 530,649

1 Claim. (Cl. 29—148.3)

This invention relates to improvements in the method of making tread members or track units for endless tracks of a tank or like vehicle.

The principal object of the invention is to provide an improved method of manufacture of fabricated tread members made up of relatively simple, inexpensive parts of relatively light weight and requiring a minimum of machining, to take the place of certain forms of tread members at present employed as standard equipment for army tanks, and which are made from relatively massive castings or forgings and require several more or less costly machining operations in their manufacture.

This application is a division of my application, Serial No. 435,208, filed March 8, 1942.

In a common form of army tank now in use, the endless tracks or so-called "caterpillar" treads on opposite sides of the vehicle each consists of an endless track or belt made up of a plurality of tread members, generally in the form of separate tread blocks, connected together by hinged links along opposite sides thereof. The track is supported at opposite ends of the vehicle on large sprocket wheels, and a series of smaller bogie or idler wheels are carried on the vehicle frame and bear against the upper surface of the lower lead or reach of the track. In a preferred form, the bogie wheels are provided with a rubber periphery, and has engagement with rubber-covered upper surfaces of the tread blocks, while the main body of said blocks and their ground-engaging lower faces are made of metal. In the case of heavier types of tanks, each endless tread member may consist of two rows of such individual tread units or blocks. As previously mentioned, these tread units or blocks have heretofore been made of solid castings or forgings. Such pieces must be finished with several machining operations, including that of forming longitudinal bores at opposite ends thereof to provide suitable pivotal bearings for the pivot pins and their connecting links.

In carrying out my invention, I provide an improved method and arrangement for fabricating the tread units from relatively light, preforming parts, including a pair of tubular sleeve sections which provide the pivotal bearings for the pivot pins, and separate upper and lower clamping plates which are assembled on and secured to said tubular sleeve sections with a minimum amount of machining and labor so as to provide a lighter, more economical, and yet entirely satisfactory tread block or unit for the intended purpose above described.

The invention may best be understood by reference to the accompanying drawing, in which Figure 1 is a perspective view of a completed tread block or unit made in accordance with my invention.

Figure 2 is a detail section taken on line 2—2 of Figure 1.

Figure 3 is a detail section taken on the irregular line 3—3 of Figure 1.

Figure 4 is a fragmentary top plan view of the top plate in assembled form on the tubular pivot bearings, before the rubber facing has been applied to the upper surface of said top plate.

Figure 5 is an end view of the parts shown in Figure 4.

Figure 6 is a bottom view of the bottom or traction shoe, before assembly.

Figure 7 is an end view of the bottom shoe shown in Figure 6.

Referring now to details of the embodiment of my invention as illustrated, the tread block 10 consists essentially of three parts, viz: A bottom traction shoe or plate 11, an upper clamping plate 12, and a pair of tubular bearing sleeves 13, 13.

The bottom traction shoe 11 is in the form of a generally rectangular plate formed with a centrally disposed ridge 14 and laterally extending trough-like channels 15, 15 along opposite sides thereof, curved in transverse section, to conform with the shape of the tubular sleeves 13, as clearly shown in Figures 2 and 7. A plurality of rivet holes 16, 16, herein three in number, are formed in cylindrically upset bosses 17, 17 in equi-spaced relation along the ridge 14, for insertion of rivets 18, 18 as will hereinafter more fully appear. Transverse ribs 19, 19 are formed on the under side of the plate bridging the channels 15, 15 between adjacent rivet holes 16, 16.

A plurality of lugs or cleats 20, 20 of any suitable form and arrangement may be formed on the bottom of the shoe 11, preferably along the channels 15, 15. The arrangement of cleats shown herein is merely suggestive of numerous tread patterns or designs that may be employed for varying conditions of use.

The upper or clamping plate 12, as shown herein, is also generally rectangular in shape, and is preferably of a composite construction, namely, a metal base 21 and a rubber outer facing 22. The latter affords such rubber-to-rubber contact with rubber-rimmed bogie wheels as is often considered desirable in endless tread devices of this character. The metal base plate 21 is formed with a centrally disposed trough 23, and laterally extending channels 24, 24 along opposite sides thereof, curved in transverse section to conform with the shape of the tubular sleeves 13, as clearly shown in Figures 2 and 5. A series of three rivet holes 25 are provided along the bottom of trough 23 to register with holes 16 in the bottom shoe 11. Transverse ribs 26, 26 bridge the trough between adjacent rivet holes 25, as shown in Figures 3 and 4.

The rubber facing 22 is vulcanized to the back of plate 21 after the metal parts are fully assembled, as will presently appear.

The tubular sleeves 13, 13 may be formed of stock steel tubing of suitable thickness and diameter, cut to length so as to fit with their opposed upper and lower surfaces partially enclosed between the opposed pairs of channels 15 and 24 of the bottom shoe 11 and the upper plate 21. The inner diameter of said tubing is preferably of the proper size to receive the particular form of pivot structure which is to be used with the tread units, which structure may, for instance, consist of the usual form of tortional rubber connection, comprising a pivot pin (not shown) having a rubber sleeve vulcanized thereon and inserted under pressure within the bore of each bearing sleeve.

It will be understood that the bottom shoe 11 may be made by casting, or forging, while the upper plate 21, being somewhat lighter and of substantially uniform thickness, is preferably formed by stamping or pressing. In some instances, however, the upper clamping plate 12 may be made of a one-piece metal casting or forging, without any rubber facing.

The method of assembly of the parts above described may now be explained as follows: The tubular sleeves are first permanently secured in the curved marginal channels 24, 24 of upper plate 21 by a suitable metallic fusion operation, such as by brazing or welding, along the full length and width of their respective meeting surfaces, as indicated by crossed lines in Figure 5. In practice, I find that brazing is satisfactory for this purpose. The bottom shoe 11 is then clamped to the partial assembly by means of the rivets 18, 18 as shown in Figure 2. In the preferred arrangement, the bosses 17, 17 are formed so that there is a slight clearance, say, ⅛ inch between their upper surface and the bottom face plate 21 when the parts are initially engaged, as indicated in dotted lines in Figure 2. During riveting, pressure is applied along the center of the plate 21 so as to draw the two parts together and hold them under slight clamping tension against the sleeves 13, 13 after the riveting is completed. This insures a tight-fitting engagement between the sleeves and the lower shoe 11 at all times, and strengthens the block assembly against longitudinal pulling stresses.

After the metal parts are secured together, the rubber facing 22 may be applied to the upper surface of plate 21 by vulcanizing in the usual manner.

A tread member or unit constructed as above described has the advantages of economy in manufacturing due to the minimum amount of machining required, while the completed unit is considerably lighter in weight than a tread unit of similar size made of one-piece castings or forgings. Moreover, the individual metal parts may be of different types of steel best suited for their particular functions. For instance, the bottom shoe may be made of a wear-resisting steel such as a manganese alloy, while the upper plate 21 may be of a steel more suitable for stamping or pressing operations.

Although I have shown and described one particular embodiment of my invention, it will be understood that I do not wish to be limited to the exact construction shown and described, but that various changes and modifications may be made without departing from the spirit and scope of my invention as defined in the appended claim.

I claim:

The method of fabricating a tread block consisting of two laterally spaced steel tube sections, an upper plate formed with curved marginal channels adapted to partially surround the upper surfaces of said tube sections in closely fitting relation, and a bottom shoe formed with marginal channels adapted to partially surround the bottom surfaces of said tube sections, which consists in initially securing said upper plate to said tube sections by metallic fusion along the meeting surfaces of said marginal channels, applying said bottom shoe to said assembly with the central portions of said upper plate and bottom shoe in spaced relation to form a unitary pivot bearing assembly, and thereafter securing said bottom shoe to said assembly under clamping tension by compressive fastening means connecting the central portions of said upper plate and said bottom shoe respectively.

FRANK E. BURGESS.